United States Patent
Ueta et al.

(10) Patent No.: US 6,827,352 B2
(45) Date of Patent: Dec. 7, 2004

(54) METAL GASKET (75) Inventors: Kosaku Ueta, Okabe-machi (JP); Jun Okano, Fukiage-machi (JP)

(73) Assignee: Japan Metal Gasket Co., Ltd. (JP)

( * ) Notice: Subject to any disclaimer, the term of this patent is extended or adjusted under 35 U.S.C. 154(b) by 0 days.

(21) Appl. No.: 10/333,145

(22) PCT Filed: Mar. 7, 2001

(86) PCT No.: PCT/JP01/01779
§ 371 (c)(1),
(2), (4) Date: Jan. 15, 2003

(87) PCT Pub. No.: WO02/070886
PCT Pub. Date: Sep. 19, 2002

(65) Prior Publication Data
US 2003/0151210 A1 Aug. 14, 2003

(51) Int. Cl.$^7$ ................................................ F02F 11/00
(52) U.S. Cl. ........................ 277/593; 277/592; 277/594
(58) Field of Search ................................ 277/592, 593, 277/594, 596

(56) References Cited

U.S. PATENT DOCUMENTS

| | | | | |
|---|---|---|---|---|
| 4,351,534 A | * | 9/1982 | McDowell | 277/592 |
| 4,721,315 A | * | 1/1988 | Ueta | 277/593 |
| 4,861,046 A | * | 8/1989 | Udagawa | 277/595 |
| 5,022,664 A | * | 6/1991 | Kitada et al. | 277/591 |
| 5,240,262 A | * | 8/1993 | Udagawa et al. | 277/593 |
| 5,280,928 A | * | 1/1994 | Ueta et al. | 277/595 |
| 5,427,388 A | * | 6/1995 | Ueta | 277/595 |
| 5,628,518 A | * | 5/1997 | Ushio et al. | 277/593 |
| 5,876,038 A | * | 3/1999 | Bohm et al. | 277/593 |
| 6,206,381 B1 | * | 3/2001 | Ii et al. | 277/593 |
| 6,283,480 B1 | * | 9/2001 | Miura et al. | 277/593 |
| 6,322,084 B1 | * | 11/2001 | Yamada et al. | 277/591 |
| 6,328,314 B1 | * | 12/2001 | Jinno et al. | 277/593 |
| 6,378,876 B1 | * | 4/2002 | Matsushita | 277/593 |
| 6,431,554 B1 | * | 8/2002 | Miyamoto et al. | 277/593 |
| 6,705,618 B2 | * | 3/2004 | Jinno et al. | 277/593 |

FOREIGN PATENT DOCUMENTS

| | | |
|---|---|---|
| JP | 2-129468 | 5/1990 |
| JP | 6-014624 | 2/1994 |
| JP | 8-178070 | 7/1996 |

OTHER PUBLICATIONS

Copy of English translation of International Preliminary Examination Report for PCT/JP01/01779 dated Sep. 18, 2001.

* cited by examiner

Primary Examiner—Alison K. Pickard
(74) Attorney, Agent, or Firm—Young & Basile, P.C.

(57) ABSTRACT

A metallic gasket capable of providing a sufficient sealing capability all around a combustion chamber hole and avoiding such problems that the step of a cylinder block supporting the lower end part of a cast-iron sleeve is damaged by the thermal expansion of the sleeve during the operation, the roundness of a bore is impaired, the cast-iron sleeve is sunk, and a pressure leaks between the fastening bolts, wherein the end part of a shim plate (14) on a combustion chamber hole (12) side is disposed on the upper end surface of the cast-iron sleeve (2) radially outside the outer peripheral position ($OL_1$), the end part of the shim plate (14) more distant from the combustion chamber hole (12) is disposed on the combustion chamber hole (12) side from an outside line ($OL_2$) of the water jacket (4) formed in the cylinder block (1), and a part of a full bead (13) is disposed on the upper end surface of the cast-iron sleeve (2).

3 Claims, 9 Drawing Sheets

METAL GASKET

TECHNICAL FIELD

The present invention relates to a metallic gasket that comprises a base plate having a bead around the periphery of a combustion chamber hole therein and a thinner shim plate than the base plate laminated on the base plate.

BACKGROUND ART

Figure 21:
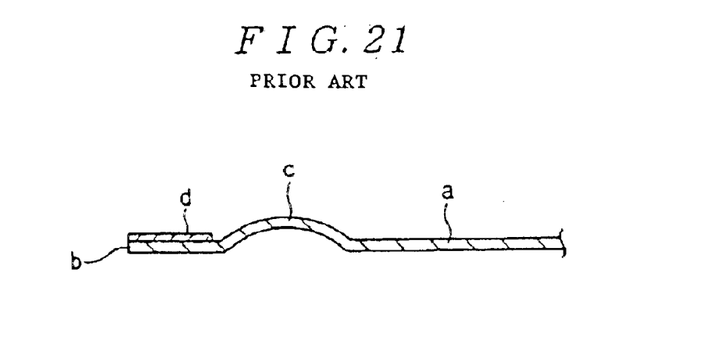
FIG. 21 is an explanatory cross-sectional view of a prior art metallic gasket.
Figure 22:
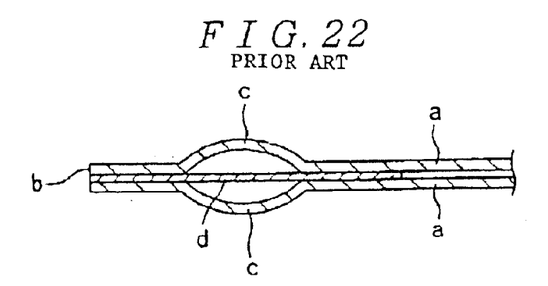
FIG. 22 is an explanatory cross-sectional view of another prior art metallic gasket.
Figure 23:
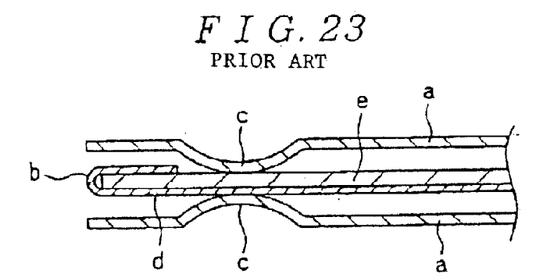
FIG. 23 is an explanatory cross-sectional view of still another prior art metallic gasket.

The prior-art metallic gaskets of this type, for example, include a base plate a having a combustion chamber hole b therein and a thinner shim plate d than the base plate laminated on a limited area of the base plate around the periphery of the combustion chamber hole b (present on the combustion chamber hole side of a base plate bead c), as shown in FIG. 21; two base plates a and a shim plate d interposed between them, as shown in FIG. 22; and two base plates a, a shim plate d and a secondary plate e interposed between the two base plates a with an edge of the shim plate d on the combustion chamber hole b side folded back so as to cover an edge of the secondary plate e, as shown in FIG. 23.

In any of these metallic gaskets, the limited area around the periphery of the combustion chamber hole b is formed so as to have a maximum total thickness compared to the other areas of the gasket such that when the metallic gasket is interposed between joining surfaces of the cylinder head and the cylinder block, and the cylinder head and the cylinder block are fastened by the fastening bolts, a surface pressure is concentrated on the limited area around the periphery of the combustion chamber hole b to thereby apply a maximum load to the periphery of the rim of the cylinder bore to seal.

Figure 24:
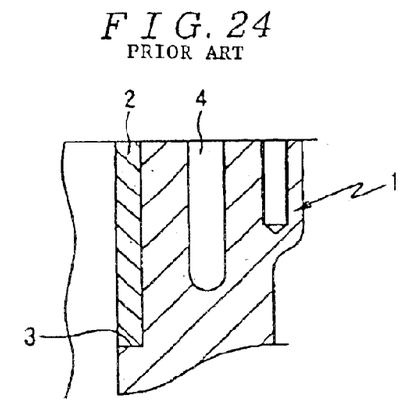
FIG. 24 is an explanatory cross-sectional view of an aluminum cylinder block into which a cast-iron sleeve is fitted.

FIG. 24 shows a recent aluminum cylinder block employed frequently by a demand for a reduction in the engine weight. The cylinder block 1 has a cylindrical cast-iron sleeve 2, for example press-fitted into a cylinder bore in the cylinder block 1 and supported at its lower end by a step 3 formed on the cylinder block 1 from a standpoint of durability and wear resistance of the bore. In order to enhance the cooling efficiency of the engine by cooling water in water jackets 4 formed in the cylinder block 1, the sleeve 2 is thinned as much as possible (to about 2–5 mm) with the aid of the advancement of recent working techniques or the like.

However, when the metallic gasket is interposed between the joining surfaces of the cylinder block 1 and the cylinder head (not shown), and the cylinder block 1 and the cylinder head are fastened by the fastening bolts, the following problems would occur:

The cast-iron sleeve 2 on the bore side is heated to high temperature during running to thereby conduct heat to the aluminum cylinder block 1 in contact with the sleeve 2, which is thus cooled. Since an extremely large amount of heat is produced on the cylinder bore side, the sleeve 2 that has no cooling structure would axially expand thermally due to a difference in temperature and hence cubical expansion between the sleeve 2 and the cylinder block 1 to thereby intend to protrude outwards from the deck of the cylinder block 1.

Therefore, with the metallic gasket comprising the thickened area that includes the limited area around the periphery of the combustion chamber hole b formed therein and the shim plate d laminated on the limited area such that the maximum load is applied to the periphery of the rim of the cylinder bore, the thickened area is pushed by an upper end of the sleeve 2 to thereby produce an excessive surface pressure in the vicinity of the fastening bolts especially in a high surface-pressure area around the periphery of the sleeve 2. As a result, the step 3 on the cylinder block 1 supporting the lower end of the thin sleeve 2 would be broken undesirably. In addition, the sleeve 2 would be deformed due to an extremely uneven surface-pressure in the periphery of the sleeve (in the areas in the vicinity of and between each bolt) to thereby impair the roundness of the cylinder bore.

Even when the step 3 on the cylinder block 1 is not broken, the sleeve 2 could sink when the area of the step 3 is small. In addition, when the cylinder head has low rigidity, the sleeve 2 could push the cylinder head up to thereby cause pressure leakage from between the fastening bolts.

Instead of the engine with the cast-iron sleeve pressed into the cylinder bore as described above, so-called all-aluminum engines have recently started to be employed in which the aluminum cylinder block has a directly formed bore whose inner peripheral surface (aluminum surface) is coated by plating or exposure with a film of metal, ceramic or resin to ensure durability.

Such all-aluminum engine is capable of avoiding the defects of the cast-iron sleeve mentioned above. It is lightweight and has high thermal conductivity. Therefore, this improves the cooling efficiency of the engine by the cooling water within the water jackets of the cylinder block.

With the all-aluminum engine, however, the periphery of the rim of the cylinder bore has low rigidity compared to the cylinder block into which the cast-iron sleeve is press fitted. Thus, with the metallic gasket that has formed a thickened area around the periphery of the combustion chamber hole b by laminating the shim plate d on the base plate around the periphery of the combustion chamber hole b so as to apply the maximum load to the periphery of the rim of the cylinder bore, the periphery of the rim of the cylinder bore would be deformed due to the maximum load to thereby make it difficult to ensure the roundness of the cylinder bore.

The present invention has been made to eliminate such defects. It is an object of the present invention to provide a metallic gasket capable of providing sufficient sealing performance through the overall periphery of the combustion chamber hole and when used with an engine into which the cast-iron sleeve is press fitted, avoiding difficulties occurring due to axial thermal expansion of the cast-iron sleeve during running, i.e., breakage of the step on the cylinder block supporting the sleeve at its lower end, impairment of the roundness of the cylinder bore, sinking of the sleeve, and occurrence of pressure leakage from between the fastening bolts, and when used in the all-aluminum engine, capable of ensuring the roundness of the cylinder bore well.

DISCLOSURE OF THE INVENTION

The present invention provides a metallic gasket comprising a base plate having a bead around a combustion chamber hole formed therein, and a thinner shim plate than the base plate laminated on the base plate, the metallic gasket being adapted to be interposed between joining surfaces of a cylinder head and a cylinder block and fastened by fastening bolts through the cylinder head and cylinder block to seal between the joining surfaces, wherein:

an edge of the shim plate on the combustion chamber hole side is located radially outside the combustion chamber hole in spaced relationship to the combustion chamber hole and an edge of the shim plate distant from the combustion chamber hole is located on the combustion chamber hole side from bolt insertion holes in the base plate formed outside the bead so as to avoid a water hole formed between each of the bolt insertion holes and the bead.

According to the present invention, the surface pressure is concentrated on the periphery of the combustion chamber hole due to the difference in thickness between a thickened area of the periphery of combustion chamber hole laminating the shim plate and the other thinner areas of the gasket. Thus, the maximum load works on the periphery of the rim of the cylinder bore where the sealing conditions are most severe. In addition, a possible high-temperature high-pressure combustion gas is sealed by the sealing pressure based on a resiliency of the compressed deformed bead to thereby provide sufficient sealing performance through the overall periphery of the combustion chamber hole.

Since the edge of the shim plate on the combustion chamber hole side is located radially outside the combustion chamber hole, no maximum load works on the low-rigidity periphery of the rim of the cylinder bore. As a result, when the gasket is used with the all-aluminum engine, the periphery of the rim of the cylinder bore is prevented from being deformed to thereby ensure the roundness of the cylinder bore sufficiently.

In this case, the thin plate may be disposed such that an edge portion of the shim plate on the combustion chamber hole side between the bolt insertion holes is located close to the combustion chamber hole and an edge portion of the shim plate in the vicinity of each bolt insertion hole is located less close from the combustion chamber hole to thereby make uniform the surface pressure that works on the overall periphery of the rim of the cylinder bore.

When the gasket is used in an engine where a cast-iron sleeve is fitted into the cylinder block, the edge of the shim plate on the combustion chamber hole side may be located radially outside the outer periphery of an upper end of the cast-iron sleeve and at least part of the bead may be disposed on the upper end of the sleeve in order to advantageously avoid difficulties that would otherwise occur due to thermal axial expansion of the sleeve during running, i.e., breakage of the step on the cylinder block supporting the lower end of the sleeve, damage to the roundness of the cylinder bore, sinking of the sleeve, and pressure leakage from between the fastening bolts.

In addition, with an engine where the cast-iron sleeve is pressed and the space between the cylinder bores is large, a metallic gasket including a plurality of beads spaced one from another in a radially outward direction from the combustion chamber hole may be used such that a part or all of that of the plurality of beads nearest to the combustion chamber hole is disposed on an upper end of the cast-iron sleeve pressed into the engine.

BEST MODE FOR CARRYING OUT THE INVENTION

Embodiments of the present invention will be now described with reference to the drawings.

Figure 1:
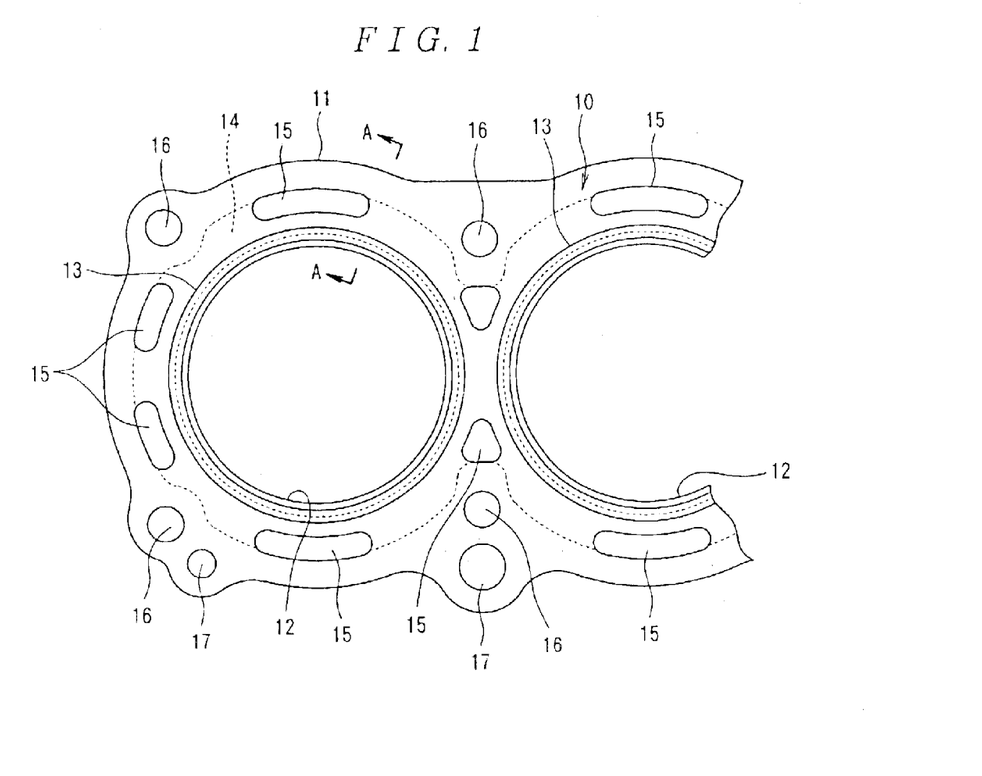
FIG. 1 is an explanatory plan view of an essential portion of a metallic gasket as one embodiment of the present invention.
Figure 2:
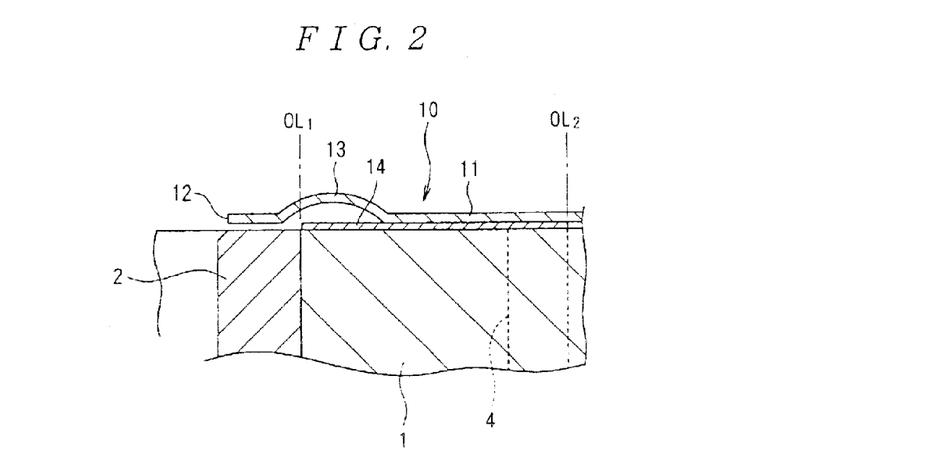
FIG. 2 is a cross-sectional view of the gasket taken along a line A—A of FIG. 1.
Figure 14:
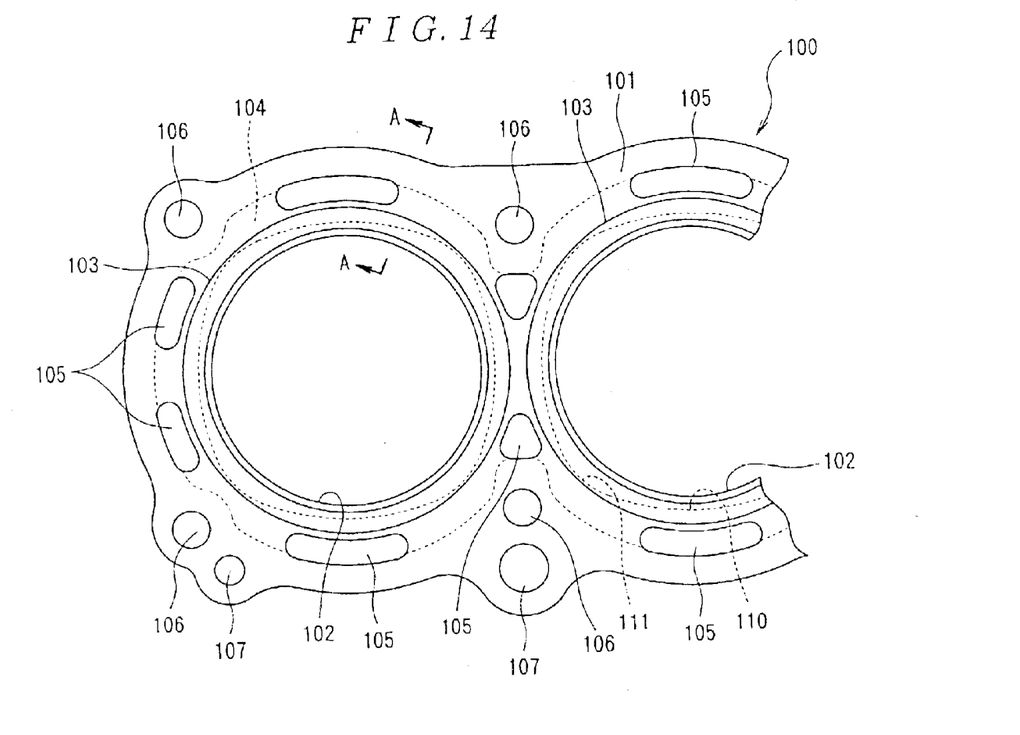
FIG. 14 is an explanatory cross-sectional view of still another embodiment of the present invention.
Figure 15:
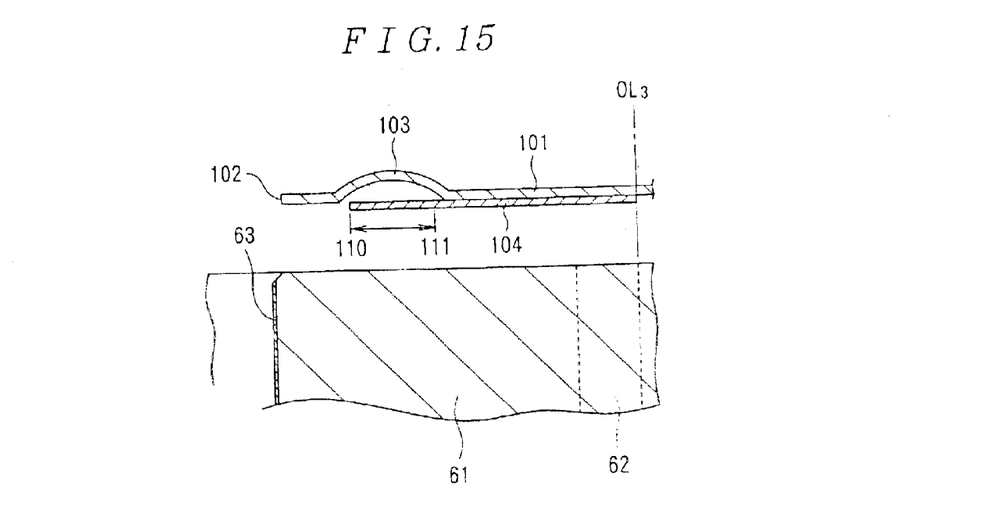
FIG. 15 is a cross-sectional view of the gasket taken along a line A—A of FIG. 14.
Figure 16:
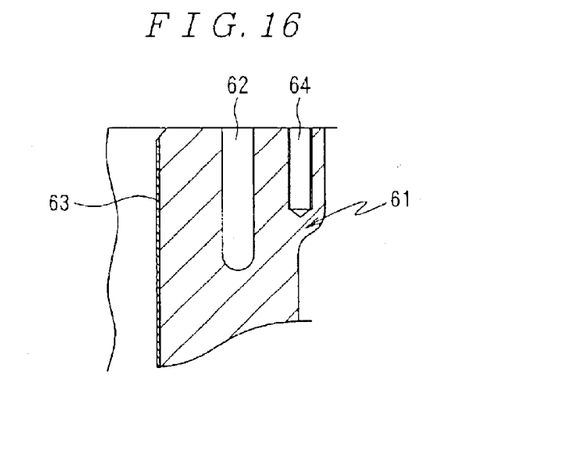
FIG. 16 is an explanatory cross-sectional view of an all-aluminum cylinder block.

FIG. 1 is an explanatory plan view of an essential portion of a metallic gasket as one embodiment of the present invention. FIG. 2 is a cross-sectional view taken along a line A—A of FIG. 1. FIGS. 3–13 and 17–20 each are an explanatory cross-sectional view of another embodiment of the present invention. FIG. 14 is an explanatory cross-sectional view of a further embodiment of the present invention. FIG. 15 is a cross-sectional view taken along a line A—A of FIG. 14. FIG. 16 is an explanatory cross-sectional view of an all-aluminum cylinder block. These embodiments will be explained by taking as an example a metallic gasket interposed between the aluminum cylinder block and the cylinder head. The aluminum cylinder block where the cast-iron sleeve is fitted is similar to that of FIG. 24. Like reference numerals denote corresponding elements throughout in the drawings.

Referring to FIGS. 1 and 2, the metallic gasket 10 comprises a base plate 11 having a full bead 13 surrounding the periphery of each combustion chamber hole 12 formed therein, and a thinner shim plate 14 than the base plate 11 laminated on a concave side of the full bead 13 of the base plate 11. Water holes 15 are formed in correspondence to water jackets 4 in the aluminum cylinder block 1 around the periphery of the full bead 13 of the base plate 11. Bolt insertion holes 16 and oil holes 17 are formed around the water holes 15.

In this embodiment, the shim plate 14 is disposed such that its edge present on the combustion chamber hole 12 side is located outside the outer periphery $OL_1$ of an upper end of the cast-iron sleeve 2 fitted into a cylinder bore in the cylinder block 1 and its other edge distant from the combustion chamber hole 12 is located on the combustion chamber hole 12 side from the outer peripheral line $OL_2$ of the water jackets 4 in the cylinder block 1, excluding the water holes 15. The full bead 13 is disposed partially on an upper end of the sleeve 2. Thus, the area of the gasket where the shim plate 14 is laminated on the base plate has a thickness greater than the other areas of the gasket. The edge of the shim plate 14 distant from the combustion chamber hole 12 may be located somewhat outside the outer line $OL_2$ of the water jackets 4 in the cylinder block 1, but it is preferably located on the combustion chamber hole 12 side away from the outer peripheral line $OL_2$ from a standpoint of reducing the cost of the materials.

When such metallic gasket is interposed between the cylinder block 1 and the cylinder head, and the cylinder block 1 and the cylinder head are fastened by fastening bolts, the full bead 13 is compressed and deformed in the direction of its thickness. When the fastening is completed, a possible high-temperature high-pressure combustion gas is sealed at a first stage by the sealing pressure due to the resiliency of the full bead 13 compressed and deformed at the upper end of the sleeve 2. In addition, due to a difference in thickness between the thickened area including the laminated shim plate 14 around the periphery of the combustion chamber hole 12 and the other thinner areas of the gasket, surface pressure is concentrated on the thickened area around the periphery of the sleeve 2 in the combustion chamber hole 12. Thus, a maximum load works around the periphery of the rim of the cylinder bore where the sealing conditions are most severe. Hence, the high-temperature high-pressure combustion gas is sealed at a second stage by the sealing pressure based on the resiliency of the compressed and deformed full bead 13. Thus, satisfactory sealing performance is provided through the overall periphery of the combustion chamber hole 12.

Since in this embodiment the shim plate 14 is disposed radially outside the outer periphery $OL_1$ of the upper end of the sleeve 2 and the full bead 13 is partially disposed on the upper end of the sleeve 2, a space equal to the thickness of the shim plate 14 is formed between the upper end of the sleeve 2 and the deck of the cylinder head. Therefore, even when the sleeve 2 thermally expands axially due to a difference in cubical expansion based on the difference in temperature between the sleeve 2 and the cylinder block 1 occurring during running and the upper end of the sleeve 2 protrudes upwards from the deck of the cylinder block 1 to thereby push the base plate 11 upwards, the pressing force is absorbed by an elastic deformation of the base plate 11 using a partial resiliency of the full bead 13 in the gap. Thus, an excessively high surface pressure is prevented from occurring in the vicinity of each fastening bolt, especially in a high surface pressure area of the periphery of the sleeve 2. As a result, breakage of the step 3 on the cylinder block 1 supporting the lower end of the thin sleeve 2 is avoided.

No excessively high surface-pressure works on the sleeve 2 in its peripheral direction, which prevents impairment to the roundness of the cylinder bore due to deformation of the sleeve 2 such as occurred in the prior art. Even when the area of the step 3 on the cylinder block 1 is small, the sleeve 2 is prevented from sinking. Furthermore, when the rigidity of the cylinder head is low, the sleeve 2 is prevented from pushing the cylinder head upwards and hence no pressure leakage from between the fastening bolts is produced.

When the sleeve 2 is cooled and shrunk while the engine is at a stop, the base plate 11 pressed against the upper end of the sleeve 2 is elastically returned in conformity to shrinkage of the sleeve 2 by the resiliency of the full bead 13 disposed partially on the upper end of the sleeve 2.

Figure 3:
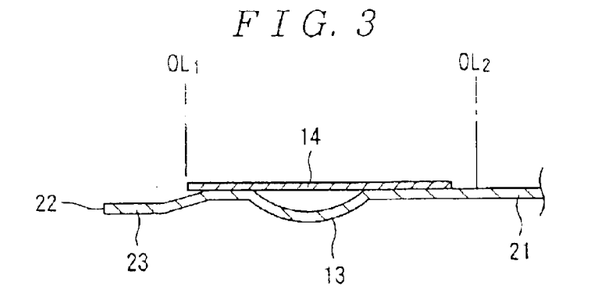
FIG. 3 is an explanatory cross-sectional view of another embodiment of the present invention.
Figure 4:
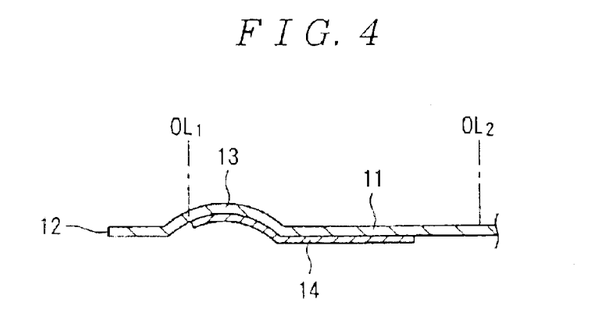
FIG. 4 is an explanatory cross-sectional view of still another embodiment of the present invention.

While in the embodiment the base plate 11 with the single bead was taken as an example, as shown in FIG. 3 a step bead 23 may be provided at the edge of the base plate 21 on the combustion chamber hole 22 side and a full bead 13 may be provided on the side of the step bead 23 distant from the combustion chamber hole 22 such that the step bead 23 may be located on the upper end of the sleeve 2. While in the embodiment the flat shim plate 14 is used as an example, the shim plate 14 may be formed so as to extend exactly along the shape of the concave surface of the full bead 13, as shown in FIG. 4.

Referring to FIGS. 5–20, metallic gaskets as other embodiments of the present invention will be described next.

Figure 5:
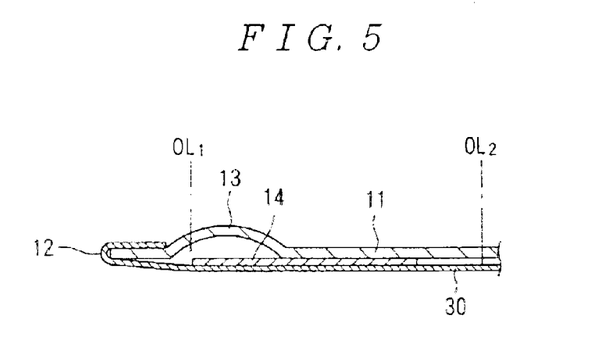
FIG. 5 is an explanatory cross-sectional view of a further embodiment of the present invention.
Figure 6:
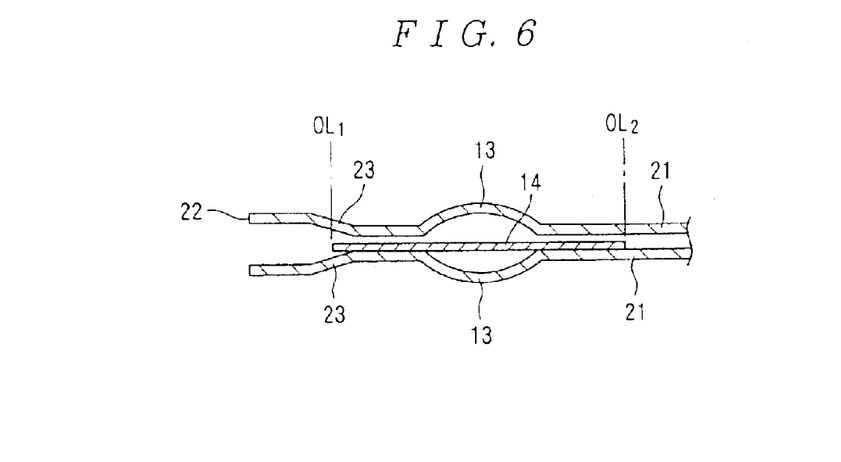
FIG. 6 is an explanatory cross-sectional view of a still further embodiment of the present invention.
Figure 7:
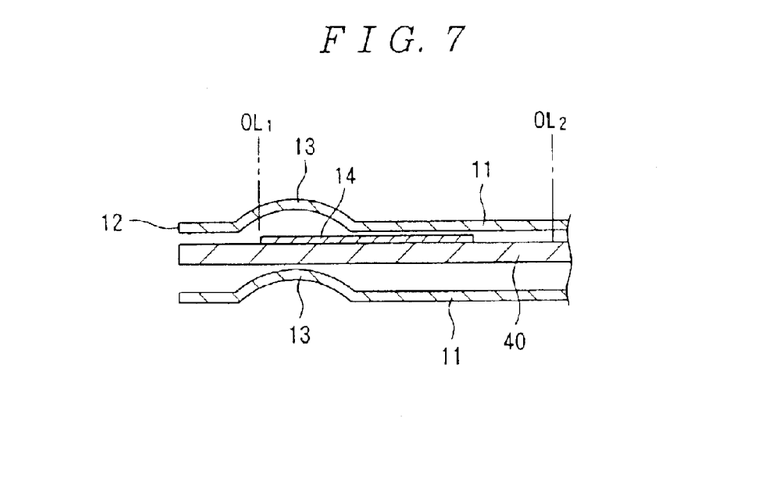
FIG. 7 is an explanatory cross-sectional view of a further embodiment of the present invention.
Figure 8:
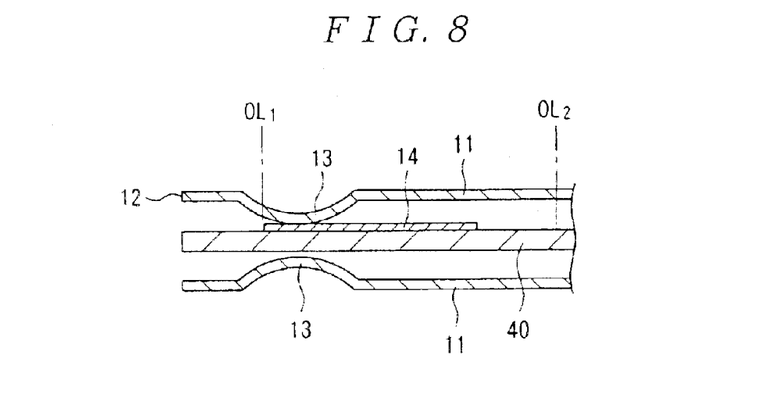
FIG. 8 is an explanatory cross-sectional view of another embodiment of the present invention.

FIGS. 5 and 6 show a metallic gasket having a 3-layered structure. The metallic gasket of FIG. 5 comprises the gasket of FIG. 2 and a thinner plate 30 than the shim plate 14 laminated on a lower surface of the shim plate 14 with an edge of the thinner plate 30 on the combustion chamber hole 12 side being folded back so as to cover the edge of the base plate 11 on the combustion chamber hole 12 side. The metallic gasket of FIG. 6 comprises the metallic gasket of FIG. 3 and a second base plate 21 having the same shape as the base plate 21 of the FIG. 3 metallic gasket disposed on an upper surface of its shim plate 14 so as to be symmetrical to the base plate 21 of the FIG. 3 gasket such that the shim plate 14 is held between the two base plates 21.

FIGS. 7–12 show metallic gaskets having a 4-layered structure comprising two base plates, a shim plate and a secondary plate to adjust the overall thickness of the gasket. The metallic gasket of FIG. 7 comprises the gasket of FIG. 2, a secondary plate 40 disposed on a lower surface of the shim plate 14 of the FIG. 2 metallic gasket and a second base plate 11 having the same shape as the base plate 11 of the FIG. 2 gasket disposed such that second base plate 11 faces in the same direction as the FIG. 2 base plate 11. The metallic gasket of FIG. 8 comprises a version of the FIG. 7 metallic gasket in which the upper base plate 11 is disposed symmetrical to the lower base plate 11.

Figure 9:
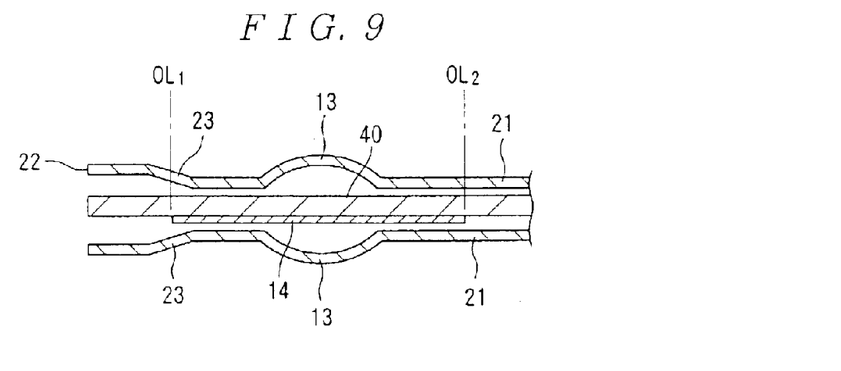
FIG. 9 is an explanatory cross-sectional view of still another embodiment of the present invention.
Figure 10:
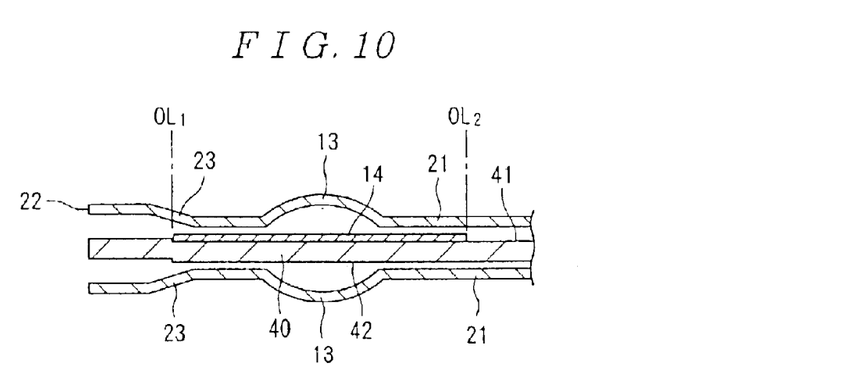
FIG. 10 is an explanatory cross-sectional view of a further embodiment of the present invention.
Figure 11:
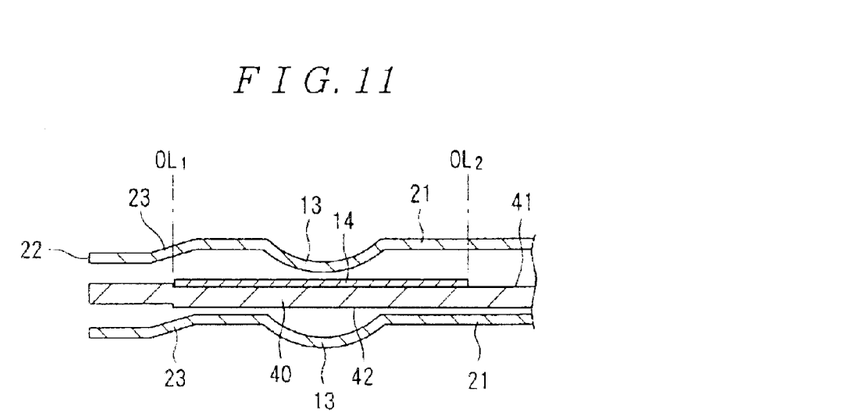
FIG. 11 is an explanatory cross-sectional view of a still further embodiment of the present invention.
Figure 12:
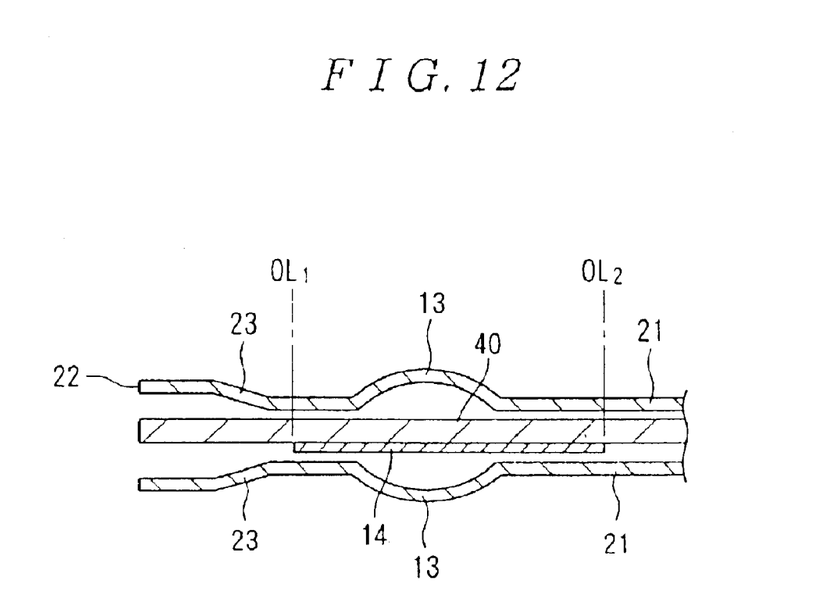
FIG. 12 is an explanatory cross-sectional view of a further embodiment of the present invention.

The metallic gasket of FIG. 9 comprises the metallic gasket of FIG. 6 and a secondary plate 40 disposed between the upper primary plate 21 and shim plate 14 of the FIG. 6. The metallic gasket of FIG. 10 comprises a version of the FIG. 9 metallic gasket in which the shim plate 14 is laminated in a recess 41 formed on (an upper surface of) the secondary plate 40 where the recess has a depth equal to about one half of the thickness of the shim plate 14 with a downward protruding area 42 having a thickness equal to about one half of the thickness of the shim plate 14. The metallic gasket of FIG. 11 comprises a version of the FIG. 10 metallic gasket where the upper base plate 21 is disposed so as to face in the same direction as the lower base plate 21. According to the metallic gaskets of FIGS. 10 and 11, the shim plate 14 protrudes by an amount equal to one half of its thickness upwards from the upper surface of the secondary plate 40 and the downward protruding area 42 protrudes downwards by an amount equal to one half of the thickness of the shim plate 14 from the lower surface of the secondary plate 40. Thus, upper and lower surface-pressure concentration effects which will be produced by the shim plate 14 are equalized. The metal plate of FIG. 12 comprises a version of the FIG. 9 metallic gasket in which the whole step beads 23 of the two kinds of beads 13 and 23 formed on the base plates 21 nearest to the combustion chamber hole 22 are disposed over the upper end of the cast-iron sleeve 2.

Figure 13:
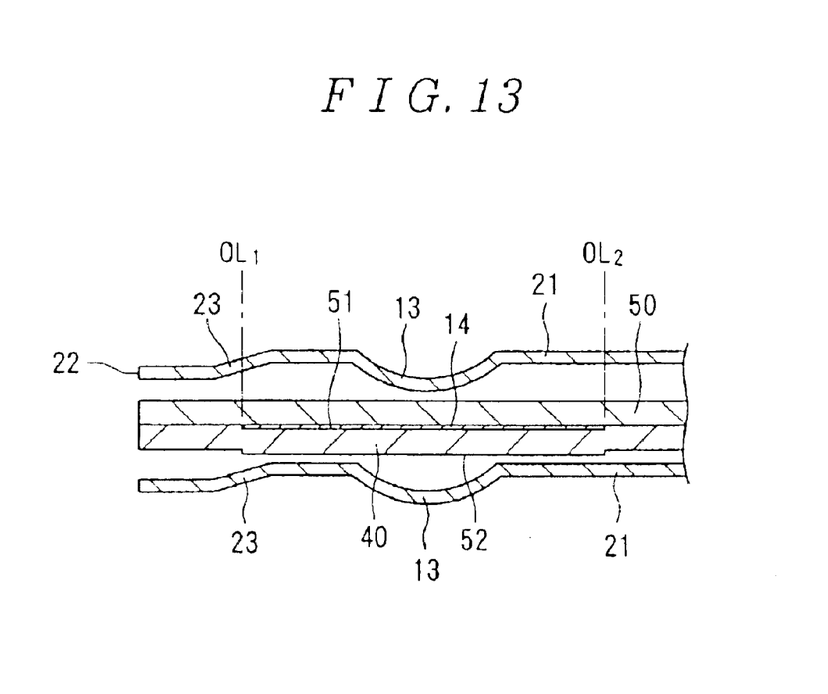
FIG. 13 is an explanatory cross-sectional view of another embodiment of the present invention.

FIG. 13 shows a metallic gasket having a 5-layered structure. It comprises a version of the FIG. 11 gasket in which the shim plate 14 is laminated in a recess 51 provided on an upper surface of the secondary plate 40 where the recess has a depth equal to the thickness of the shim plate 14 and in which a downward protruding area 52 is provided on a lower surface of the secondary plate 40 where the protruding area 52 has the same thickness as the shim plate 14. The gasket of FIG. 13 also comprises a second secondary plate 50 provided between the first-mentioned secondary plate 40 and the upper base plate 21. The metallic gaskets of the FIGS. 6 and 9–13 are well suited to the cylinders where the space between the cylinder bores is large.

FIGS. 14 and 15 show a metallic gasket well suited to an all-aluminum engine. As shown in FIG. 16, the all-aluminum engine comprises a film 63 of metal, ceramic or resin formed by plating or exposure on an inner peripheral (aluminum) surface of a cylinder bore directly provided in the aluminum cylinder block 61 in order to ensure durability. In FIG. 16, reference numeral 62 denotes a water jacket and 64 a bolt hole.

The metallic gasket 100 comprises a base plate 101 on which a full bead 103 is formed around the periphery of each combustion chamber hole 102 and a thinner shim plate 104 than the base plate 101 laminated on the concave side of the full bead 103 on the base plate 101. Water holes 105 are formed in the base plate 101 around its full bead 103 in correspondence to the water jackets 62 in the cylinder block 61. Bolt insertion holes 106 for the fastening bolts are formed around the water holes 105 in correspondence to the bolt insertion holes 64 in the cylinder block 61. Oil holes 107 are formed around the bolt insertion holes 106.

In this embodiment, the shim plate 104 is disposed such that its edge present on the combustion chamber hole 102 side is located radially outside the combustion chamber hole 102 and that its other end more distant from the combustion chamber hole 102 is located on the combustion chamber hole 102 side from the outer line $OL_3$ of the water jackets 62 in the cylinder block 61, excluding at the water hole 105. Thus, the area in which the shim plate 104 is laminated has a whole thickness greater than the other portions of the gasket. The edge of the shim plate 104 more distant from the combustion chamber hole 102 may be located somewhat outside the outer line $OL_3$ of the water jackets 62 in the cylinder block 61, but it is preferably located on the combustion chamber hole 102 side from the outer line $OL_3$ from a standpoint of cost reduction of the materials used.

The edge portion of the shim plate 104 on the combustion chamber hole 102 side between the bolt insertion holes 106 is disposed close to the combustion chamber hole 102. The edge portion of the shim plate 104 in the vicinity of each bolt insertion hole 106 is disposed less close from the combustion chamber hole 102. Positions 110 and 111 on the edge of the shim plate 104 on the combustion chamber hole 102 side closest to and most distant from the combustion chamber hole are both within the full bead 103.

When the cylinder block 61 and the cylinder head with such metallic gasket interposed between them are fastened with the fastening bolts, the full bead 103 is compressed and deformed in the direction of its thickness. When the fastening is completed, a possible high-temperature high-pressure combustion gas is sealed at a first stage by a sealing pressure based on a resiliency of the deformed full bead 103. A surface pressure is concentrated on the periphery of the combustion chamber hole 102 due to a difference in thickness between a thickened area of the periphery of the combustion chamber hole 102 laminating the shim plate 104 and the other portions of the gasket so that a maximum load works on the periphery of the rim of the cylinder bore where the sealing condition is most severe. Thus, the high-temperature high-pressure combustion gas is sealed at a second stage by the sealing pressure based on the resiliency of the compressed deformed bead 103. This provides sufficient sealing performance through the overall periphery of the combustion chamber hole 102.

In this embodiment, the edge of the shim plate 104 on the combustion chamber hole 102 side is disposed radially outside the combustion chamber hole 102. This prevents the maximum load from working on the periphery of the rim of the cylinder bore having low rigidity. As a result, the periphery of the rim of the cylinder bore is prevented from being deformed to thereby ensure the roundness of the cylinder bore well.

The edge portion of the shim plate 104 on the combustion chamber hole 102 side between the bolt insertion holes 106 where a relatively low surface-pressure works is located close to the combustion chamber hole 102 whereas the edge portion of the shim plate 104 in the vicinity of each bolt insertion hole 106 where the surface pressure is higher is located more distant from the combustion chamber hole 102. Therefore, the surface pressure working on the periphery of the rim of the cylinder bore is made uniform.

Figure 17:
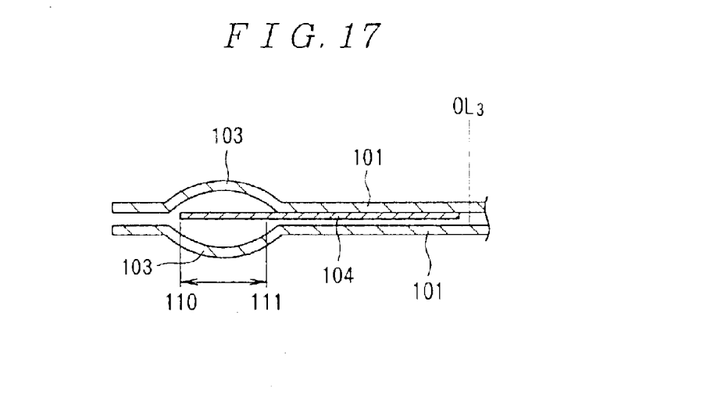
FIG. 17 is an explanatory cross-sectional view of another embodiment of the present invention.
Figure 18:
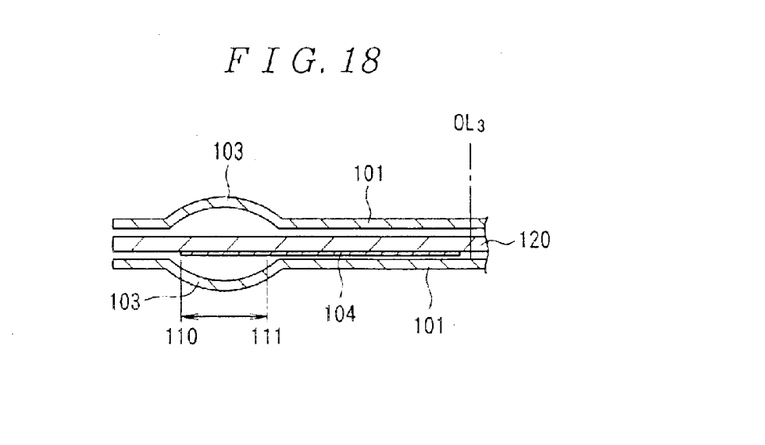
FIG. 18 is an explanatory cross-sectional view of still another embodiment of the present invention.
Figure 19:
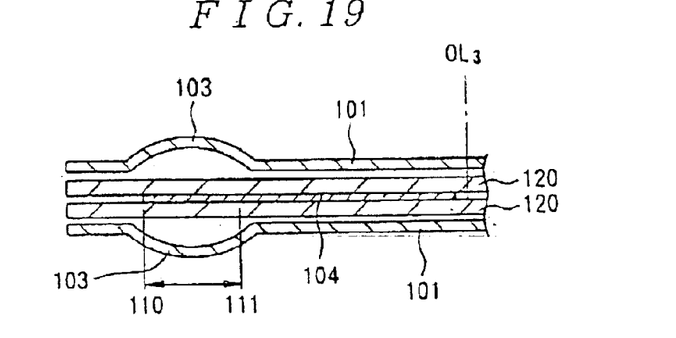
FIG. 19 is an explanatory cross-sectional view of a further embodiment of the present invention.
Figure 20:
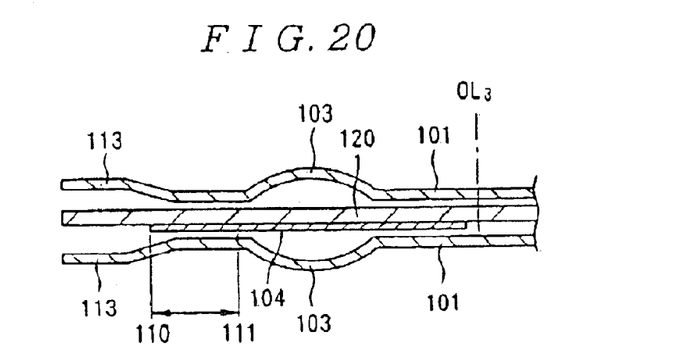
FIG. 20 is an explanatory cross-sectional view of a still further embodiment of the present invention.

The metallic gasket of FIG. 17 comprises the metallic gasket of FIG. 15 and a second base plate 101 disposed below the shim plate 104 thereof so as to be symmetrical to the base plate of the gasket of FIG. 15 with the shim plate 104 disposed between the two base plates 101. The metallic gasket of FIG. 18 comprises the gasket of FIG. 17 and a secondary plate 120 disposed on the upper surface of the shim plate 104 of the FIG. 17 gasket. The metallic gasket of FIG. 19 comprises the gasket of FIG. 18 and a second secondary plate 120 disposed on the lower surface of the shim plate 104 of the FIG. 18 gasket such that the shim plate 104 is disposed between the two secondary plates 120. The metallic gasket of FIG. 20 is well suited to a cylinder where the space between the two cylinder bores is large. It comprises a shim plate 104 and a secondary plate 120 disposed between the two base plates 101 with a step bead 113 provided at an edge of each base plate 103 on the combustion chamber hole 102 side and a full bead 103 provided on the side of each step bead 113 distant from the combustion chamber hole 102.

While the arrangement in which the edge portion of the shim plate 104 on the combustion chamber 102 side between the bolt insertion holes 106 is located close to the combustion chamber hole 102 whereas the edge portion of the shim plate 104 in the vicinity of each bolt insertion hole 106 is located less close from the combustion chamber hole 102 is employed in the respective metallic gaskets of FIGS. 14, 15 and 17–20, a similar arrangement may be employed in the metallic gaskets of FIGS. 1–13.

INDUSTRIAL APPLICABILITY

As will be obvious from the above description, according to the present invention sufficient sealing performance is provided through the overall periphery of the combustion chamber hole. In addition, a maximum load is prevented from working on the low-rigidity periphery of the rim of the cylinder bore in the all-aluminum engine. Therefore, the periphery of the rim of the cylinder bore is prevented from being deformed, thereby ensuring the roundness of the cylinder bore well, advantageously.

When the shim plate is disposed so that its edge portion present on the combustion chamber hole side between the bolt insertion holes is located close to the combustion chamber hole whereas the edge portion of the shim plate in the vicinity of each bolt insertion hole is located less close from the combustion chamber hole, the surface pressure working on the periphery of the rim of the cylinder bore is made uniform advantageously.

When the edge of the shim plate on the combustion chamber hole side is located radially outside the outer periphery of the upper end of the cast-iron sleeve and a part or all of the bead is located on the upper end of the cast-sleeve fitted into the cylinder block of the engine, difficulties are avoided advantageously that would otherwise occur due to thermal axial expansion of the sleeve during running, i.e., breakage of the step on the cylinder block supporting the lower end of the sleeve, damage to the roundness of the cylinder bore, sinking of the sleeve, and pressure leakage from between the fastening bolts.

In addition, with an engine where the cast-iron sleeve is pressed into the engine and the space between the cylinder bores is large, a metallic gasket including a plurality of beads spaced one from another in a radially outward direction from the combustion chamber hole may be used such that a part or all of that of the plurality of beads nearest to the combustion chamber hole is disposed on an upper end of the cast-iron sleeve pressed into the engine.

What is claimed is:

1. A metallic gasket comprising a base plate having a first bead around a combustion chamber hole formed therein, and a thinner shim plate than the base plate laminated on the base plate, the metallic gasket being adapted to be interposed between joining surface of a cylinder head and a cylinder block and fastened by fastening bolts through the cylinder head and cylinder block to seal between the joining surfaces, wherein;

an edge of the shim plate on the combustion chamber hole side is located radially outside the combustion chamber hole in spaced relationship to the combustion chamber hole and the edge of the shim plate more distant from the combustion chamber hole is located on the combustion chamber hole side from bolt insertion holes in the base plate formed outside the bead so as to avoid a water hole formed between each of the bolt insertion holes and the bead, and further the edge of the shim plate on the combustion chamber hole side is located radially outside tbe periphery of an upper end of a cast-iron sleeve fitted into a cylinder bore in the cylinder block and at least a part of the first bead is disposed on the upper end of the sleeve and at least partially overlapping the shim plate.

2. A metallic gasket according to claim 1, wherein an edge portion of the shim plate on the combustion chamber hole side between the bolt insertion holes is located close to the combustion chamber hole and an edge portion of the shim plate in the vicinity of each bolt insertion hole is located less close from the combustion chamber hole.

3. A metallic gasket according to claim 1, further comprising a plurality of radially spaced beads and wherein said first bead is nearest to the combustion chamber hole.

* * * * *